United States Patent
Edwards

Patent Number: 5,589,043
Date of Patent: Dec. 31, 1996

[54] MASK FOR PLATING METALS AND METHOD OF CONSTRUCTION THEREOF

[76] Inventor: James P. Edwards, 700 W. Fireweed La., Anchorage, Ak. 99503

[21] Appl. No.: 550,762

[22] Filed: Oct. 31, 1995

[51] Int. Cl.⁶ .............................. C25D 1/00; C25D 17/04; C25C 7/02; B29C 33/40
[52] U.S. Cl. ..................... 204/281; 204/285; 204/297 R; 205/70; 249/134; 264/220; 264/226; 264/259; 264/154; 264/156; 425/394; 425/411
[58] Field of Search ..................................... 204/281, 285, 204/297 R; 205/70; 425/394, 411; 249/134; 264/220, 226, 259, 154, 156

[56] References Cited

FOREIGN PATENT DOCUMENTS 59-190384  10/1984  Japan.
61-195987  8/1986   Japan.

OTHER PUBLICATIONS

Dow Corning, "Greater Versatility in Design and Production with Silastic RTV", pp. 1–7.

*Primary Examiner*—Kathryn Gorgos
*Assistant Examiner*—Edna Wong
*Attorney, Agent, or Firm*—Michael J. Tavella

[57] ABSTRACT

A two-part reusable mask to protect objects to be plated. The mask can be used for painting, chemical treatment or other treatments. By adjusting the shape of the mask, any object can be plated. In the case of coins or medallions, a two sided mask is formed. For use with coins, the coin is laid on a piece of glass. A dam is formed around the coin. A quantity of ultraviolet-sensitive liquid polymer is poured on and around the coin. The dam is covered with another piece of glass and the mold is clamped and cured. The mold is removed and an exact copy of the coin is left in the rubber. The rubber mask is then placed on a hard surface and the areas to be plated are cut out. After the mask is cut out, it is placed back over the coin and aligned. A piece of clear, hard plastic is bonded to the rubber using a clear adhesive. After the glue is cured, the plastic is cut out to match the corresponding pattern cut in the rubber. The mask is then ready to use. An electrode may be implanted in one of the masks if desired, to improve plating. Also, clamping surfaces may be added to the outside of the mask as desired.

17 Claims, 4 Drawing Sheets

MASK FOR PLATING METALS AND METHOD OF CONSTRUCTION THEREOF

This invention relates to masks used in plating metals and particularly to reusable masks used in plating metals.

BACKGROUND OF THE INVENTION

Metal plating is a common art. Plating is used to add metal to worn parts, to coat a metal with another metal and for other purposes as well. In many cases, the metal to be plated is placed directly into the plating solution so that its entire surface can be plated. Often, however, people desire to plate only portions of the metal workpiece. To prevent undesired plating, a mask is applied to the workpiece in the areas not to be plated. Typically, this mask is in the form of a liquid that is brushed onto the metal as desired and allowed to dry. Once dry, the mask creates a barrier to the plating metal. When the plating process is complete, the mask can be removed, and the metal is then ready for use.

The liquid mask method does a good job. However, it is labor intensive. Also, because the mask is applied by hand, it is not always applied uniformly from piece to piece. To overcome these problems, reusable masks have been developed. An example of such a mask is found in U.S. Pat. No. 3,527,679 to Barile. The Barile patent teaches use of a soft reusable mask for plating machine parts. The plating builds up metal on areas of the part that have worn down. The Barile mask uses a mold to form a rubberized type mask. The mask is split to allow it to be placed over individual parts. Barile also teaches cutting out portions of the mask as needed, to expose other parts of the piece to be plated. To use the mask, the mask is split and placed around the metal part. The mask is secured using a rubber band. The metal can then be plated. After the plating, the mask can be removed to be used again on the next part.

U.S. Pat. Nos. 4,294,681 and 4,126,521 also teach mask forms. U.S. Pat. No. 4,294,681 teaches a mask that has a series of regular openings formed therein. This process begins by making a mask blank. The mask blank is then placed in a mold. Polyurethane is then placed in the mold over the blank. The polyurethane is then cured and treated. The mask is then removed from the mold ready to use. This mask has more durability than the rubber masks described above. U.S. Pat. No. 4,126,521 teaches using a mask of non-porous elastic material that is formed to cover the portions of metal that are not plated. The mask is held in a carrier that applies pressure to the mask thereby forming a liquid tight seal between the carrier and the article being plated. This design also has an electrode that extends through the mask where it contacts the article to be plated. The electrode allows current to pass through the article during plating.

All of these devices work well for the purposes they were designed. U.S. Pat. No. 4,294,681 and 4,126,521 have unique characteristics that limit their use to the specific applications taught. U.S. Pat. No. 3,527,679 teaches a much broader application. However, this design has inherent problems: after the rubber mold is used a number times, it becomes weak and damaged. Thus, it has a short life. Although it is an improvement over the individual painting process for masking, it lacks durability.

SUMMARY OF THE INVENTION

The instant invention overcomes the durability problem while producing a superior mask for repeated use. The invention has a two-part mask, one for each side of the material to be plated. Moreover, the mask can be used for painting, chemical treatment or other treatments. Because this invention is designed for plating of coins and medallions, it is constructed to cover a flat, circular object. Of course, by adjusting the shape of the mask, any object can be plated in the same manner. In the case of coins or medallions, a two sided mask is formed. For use with coins, the coin is laid on a piece of glass. A dam is formed around the coin. One type of dam is a plastic sheet with a hole cut in it that is slightly larger than the coin. A quantity of ultraviolet-sensitive liquid polymer is poured on and around the coin. The dam is covered with another piece of glass and the mold is clamped and cured. The mold is removed and an exact copy of the coin is left in the rubber. The rubber mask is then placed on a hard surface and the areas to be plated are cut out. After the mask is cut out, it is placed back over the coin and aligned. A piece of clear, hard plastic is bonded to the rubber using a clear adhesive. After the glue is cured, the plastic is cut out to match the corresponding pattern cut in the rubber. The mask is then ready to use. An electrode may be implanted in one of the masks if desired, to improve plating. Also, clamping surfaces may be added to the outside of the mask as desired.

To use the mask for electroplating, a mask is applied to both sides of the coin. Because the masks are transparent, they can be quickly aligned to the coin surface. The masks are then clamped and immersed into the plating solution. The masks are watertight so only the exposed surfaces are plated. Once the plating is complete, the mask is removed, ready to be used on the next coin. The combination of the rubber and hard plastic surface provides a durable mask that can be repeatedly clamped tightly without significant wear.

DETAILED DESCRIPTION OF THE INVENTION

Figure 1:
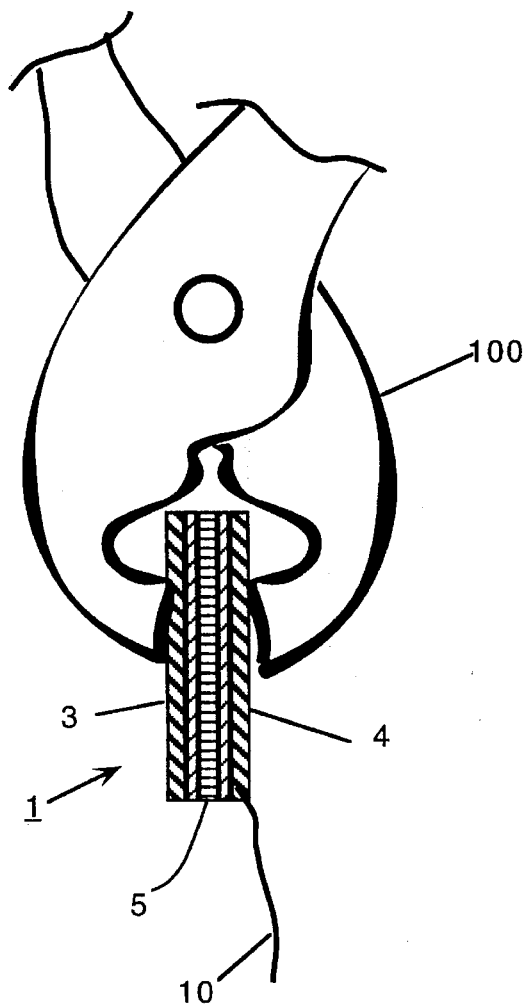
FIG. 1 is side view of the invention assembled for use.

Referring now to FIG. 1, the mask 1 is shown ready for use in a plating bath. The mask 1 has two main parts, a left side 3 and a right side 4. In this design, the mask 1 is used for plating coins and medallions. A typical coin 5 is shown placed between the parts of the mask parts 3 and 4. The mask parts 3 and 4 are discussed in greater detail below. One of the mask parts (in this case, the right part 4 can have an electrode 10 fastened to the mask part 4 to aid in the plating process. The electrode 10 is discussed in greater detail below. To secure the mask 1 for plating, the two parts 3 and 4 of the mask 1 are held by a mechanical clamp 100. Any ordinary clamp suitable for use in plating baths may be used to hold the mask 1 on the coin 5.

Figure 2:
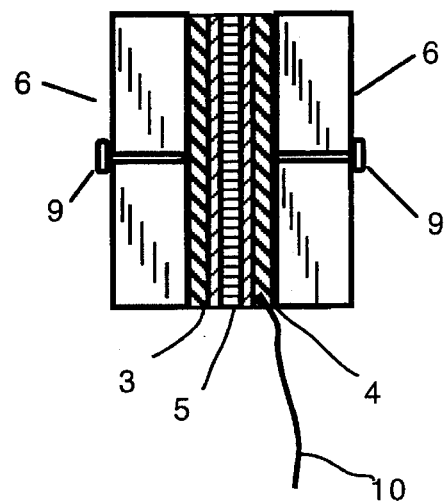
FIG. 2 is side view of the invention assembled for use, with the optional clamp supports attached.
Figure 8:
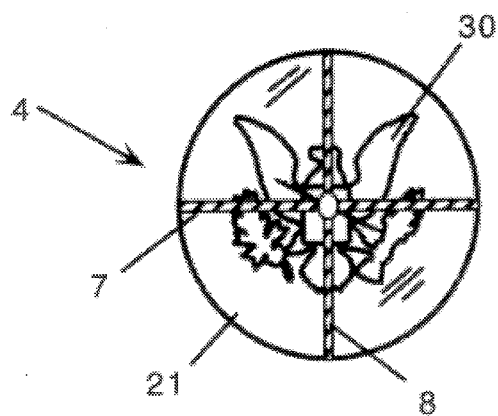
FIG. 8 is a back view of the left side of the invention as shown in FIG. 1 with a clamp support attached.

To assist in holding the mask 1 on the coin 5, clamp supports 6 can be attached to the mask parts 3 and 4. The clamp supports 6 are shown in FIG. 2 and FIG. 8. The clamp supports 6 are fashioned from thin metal strips, Other materials having similar characteristics may be used as well. The clamp supports 6 are formed from two strips of metal 7 and 8, that are formed into a cross, centered on a mask part 3 or 4. The strips 7 and 8 are secured by a small weld bead 9, which can be considered a clamp pad, placed at the center of the strips 7 and 8. The clamp supports 6 are attached to the mask parts 3 and 4 using any suitable adhesive for bonding the chosen materials; e.g., metal to a hard plastic. The clamp supports 6 allow the mask 1 to be clamped tightly without being inadvertently crushed by the clamp 100. This extends the life of the mask 1. Also, the clamping supports 6 present a thinner profile against the mask 1, thereby reducing the possibility of a poor plating job caused by a large profile clamp jaw covering part of the exposed metal portions. Finally, the clamping supports 6 allow use of a clamp 100 when a large part of the mask 1 is removed and there is no suitable place to place the clamp.

Figure 3:
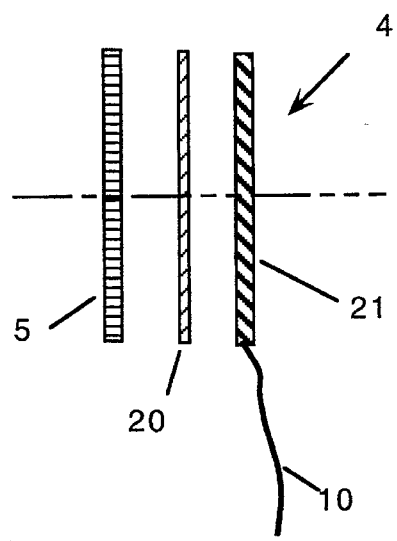
FIG. 3 is an exploded side view of the right side of the invention as shown in FIG. 1.
Figure 4:
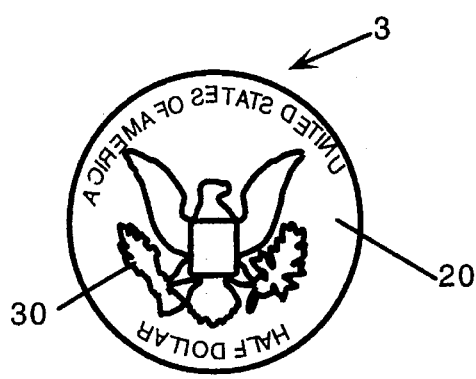
FIG. 4 is a front view of the left side of the invention as shown in FIG. 1.
Figure 5:
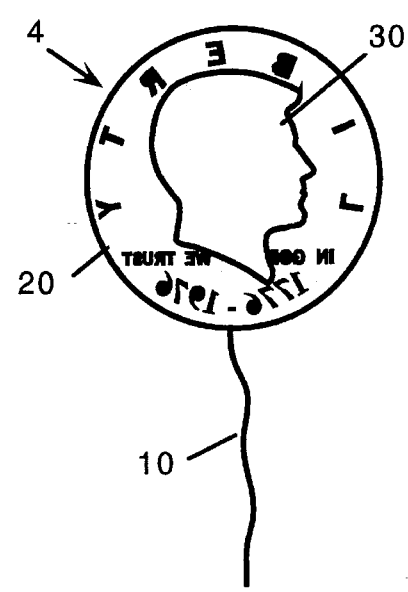
FIG. 5 is a front view of the right side of the invention as shown in FIG. 1.

Referring now to FIGS. 3, 4, 5, and 6 and 7, details of the mask parts 3 and 4 are shown. Referring now to FIG. 3, an exploded view of the mask part 4 is shown. Mask part 3 is identical in construction to mask part 4, except for the image face and the electrode 10. The mask faces 3 and 4 have an inner, rubberized mold form 20 and an outer hard plastic mold cover 21, as shown. The inner, rubberized mold form 20 is placed against the coin 5. The outer plastic mold cover 21 is attached to the inner, rubberized mold form 20 using appropriate adhesives such as cyanoacrylate or similar adhesive such as SUPERGLUE. FIG. 4 is a face view of the inner, rubberized mold form 20 for mask part 3. Note that the decorative portion 30 is cut out of the inner, rubberized mold form 20. Details of the process for making the mask 1 are discussed below. FIG. 5 shows the face view of the inner, rubberized mold form 20 of the mask part 4. Obviously, the inscriptions and images on the inner, rubberized mold form 20 varies with the object to be plated 5. The figures here are illustrative of one coin only and are not meant to be limiting.

Figure 6:
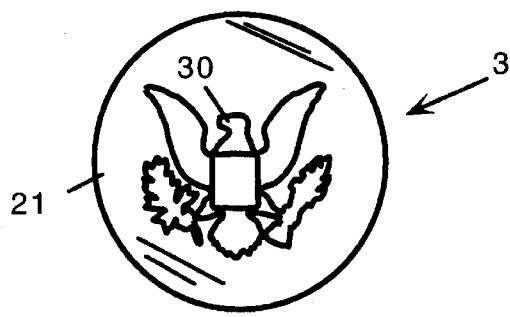
FIG. 6 is a is a back view of the left side of the invention as shown in FIG. 1.
Figure 7:
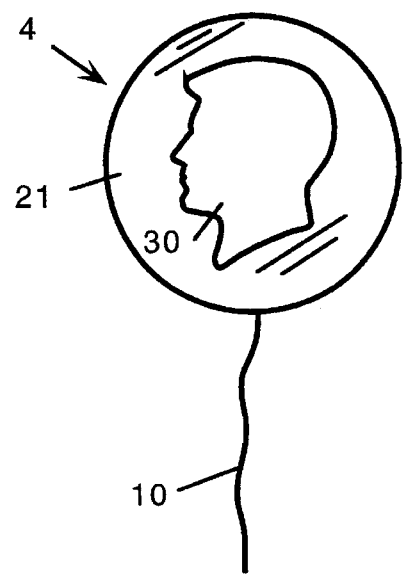
FIG. 7 is a back view of the right side of the invention as shown in FIG. 1.

FIG. 6 shows the outer face of the mask part 3, showing the hard plastic mold cover 21 for that mask part 3. FIG. 7 shows the outer face of the mask part 4, showing the hard plastic mold cover 21 for that mask part 4. Note that these figures do not show the clamp supports 6. FIG. 8 shows the outer face of the mask part 3, showing the clamp support 6 in place on that mask part. The hard plastic mold cover 21 is cut out to match the cut portions of the rubberized mold form 20. This process is described below.

Figure 9:
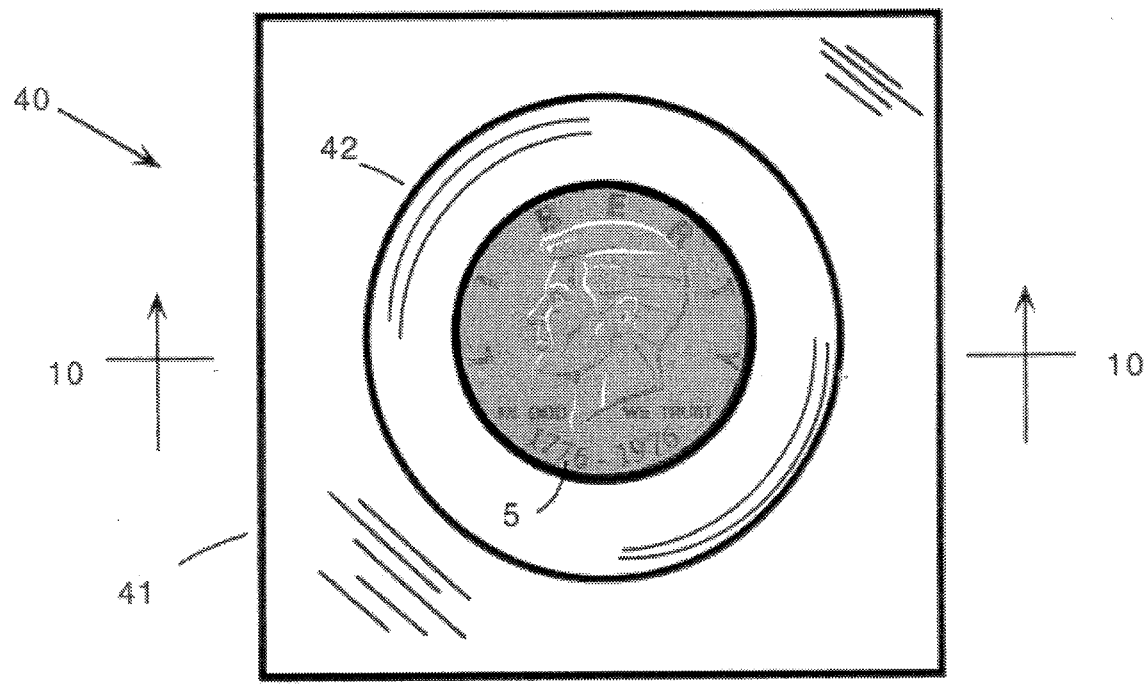
FIG. 9 is a top view of the mold for making the rubberized mask.
Figure 10:
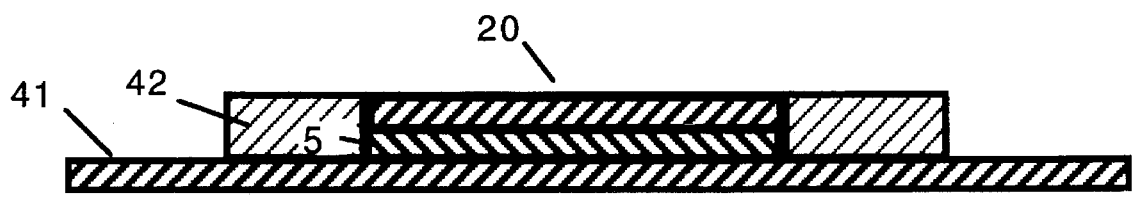
FIG. 10 is a cross-sectional view of the rubberized mask portion, taken along the lines 10—10 of FIG. 9.
Figure 11:
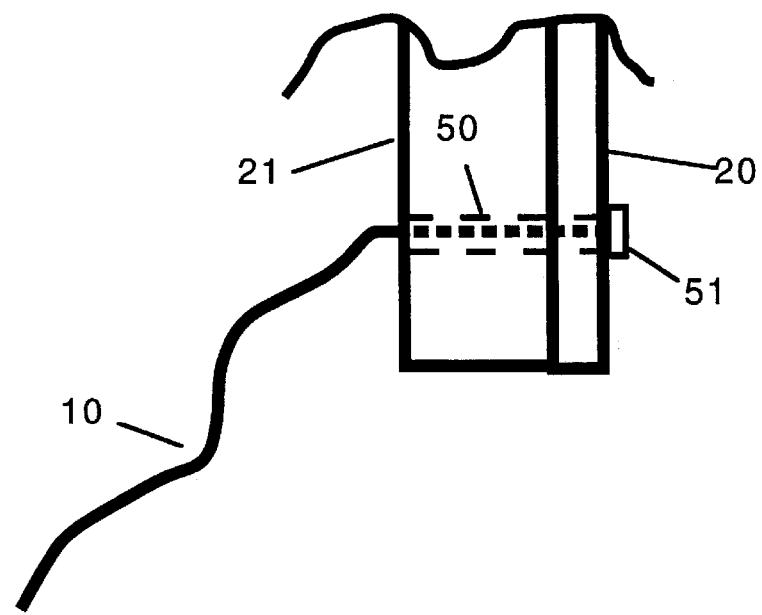
FIG. 11 is a detail of the electrode connection.

Referring now to FIG. 9, details of the mask construction are shown. To form the mask 1, the mold forms 20 are first made. To make the mold forms 20 a mold 40 is used. The mold 40 has a base plate 41. The base plate 41 can be made from glass or any other suitable material. The shape of the base plate 41 is not important as long as it is large enough to support the object to be plated 5 and the mold dam 42. The mold dam 42 is a plastic form placed around the object to be plated 5, in this case coin 5, as shown. One type of mold dam 42 is a plastic sheet with a hole cut in it that is slightly larger than the coin. FIG. 10 shows the mold dam 42 and its relative height with respect to the coin 5. The space above the coin 5 is filled with the material used to make the rubberized mold form 20. In the preferred embodiment, the rubberized mold form 20 is made from a liquid rubber photopolymer that is UV sensitive. Such a product is available from the Louis Melard Co. of Onoya ILL. 60955. To make the rubberized mold form 20, the photopolymer is poured into the mold dam 42 and smoothed until it completely covers the object to be plated 5. The dam is then covered with another piece of glass and the mold form 20 is clamped and cured. The polymer can then be cured using standard techniques as provided by the manufacturer. Once cured, the mold form 20 is removed from the mold dam 42 and inspected for flaws. Pieces of the mold form 20 are then removed to expose areas on the coin 5 that one desires to be plated. This is done by placing the mold form 20 on a hard surface and the areas to be plated are then cut out. The cutting work is done with a sharp blade using magnifying glasses as needed. After the mold form 20 has been cut to the desired form, it is placed back over the coin 5 and aligned. A piece of clear, hard plastic, that is the mold cover 21, is bonded to the rubber using a clear adhesive. After the glue is cured, the mold cover 21 is cut out to match the corresponding pattern cut in the rubber mold form 20. This cutting is typically done with a jeweler's saw or similar tool. Once the cutting operation is complete, the mask part (3 or 4) is then ready for use. If desired, a clamping support 6 can be attached to the mask part 3 or 4, as described above. Also, if desired, an electrode 10 can be attached to the mask part 3 or 4. FIG. 11 shows details of the electrode 10. To install the electrode 10, a small hole 50, of comparable size to the electrode 10, is drilled through the mask part 3 or 4 as shown. The electrode 10 is then pushed through the hole 50 until it passes through the mold part. The end 51 is then crimped back to ensure the electrode 10 makes good contact with the object to be plated 5. A small amount of adhesive can be applied around electrode 10 to secure it in place.

Both the rubberized mold form 20 and the hard plastic mold cover 21 are transparent in the preferred embodiment. Making these parts from transparent material allows the user to see the object to be placed inside the mask 1. This ensures that the mask 1 is aligned quickly with the object to be plated 5.

To use the mask 1, the mask parts 3 and 4 are formed according to the procedures discussed above. An object to be plated 5 is fitted and aligned to the mask parts 3 and 4. The mask parts are then clamped together and the entire assembly is set in a plating bath as is normal for plating operations. Once the plating is completed, the assembly is removed from the plating bath and washed as needed. The clamp 100 is then removed and the mask 1 is separated. The object being plated is then removed and the mask 1 is ready for the next object to be plated 5.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A mask for selectively plating specific areas of a piece of metal comprising:

a) a first mask part, including a rubberized mold, and a hard plastic mold cover, said hard plastic mold cover being fixedly attached to said rubberized mold, said rubberized mold and said hard plastic mold cover having an area therein cut in a specific pattern for applying plating metal to the specific areas of said piece of metal;

b) a second mask part, including a rubberized mold, and a hard plastic mold cover, said hard plastic mold cover being fixedly attached to said rubberized mold, said rubberized mold and said hard plastic mold cover having an area therein cut in a specific pattern for applying plating metal to the specific areas of said piece of metal;

c) means for securing and holding said first mask part and said second mask part about said piece of metal; and d) an electrode, fixedly attached to said second mask part such that said electrode is in electrical communication with said piece of metal when said second mask part is secured to said piece of metal for plating.

2. The mask of claim 1 wherein the means for securing and holding said first mask part and said second mask part about said piece of metal comprises a clamp.

3. The mask of claim 2 further comprising a means for supporting a clamp, fixedly attached to said first and said second mask parts.

4. The mask of claim 3 wherein the clamp supporting means comprises:

a) a first pair of metal strips fixedly attached to said first mask part; and b) a second pair of metal strips fixedly attached to said second mask part.

5. The mask of claim 4 wherein said first pair of metal strips are perpendicular on said first mask part, and said second pair of metal strips are perpendicular on said second mask part.

6. A mask for selectively plating specific areas of a piece of metal having two sides, each side having a shaped form, comprising:

a) a first mask part, including a rubberized mold, reflecting the shaped form of one side of said piece of metal, and a hard plastic mold cover, said hard plastic mold cover being fixedly attached to said rubberized mold, said rubberized mold and said hard plastic mold cover having an area therein cut in a specific pattern for applying plating metal to the specific areas of said piece of metal;

b) a second mask part, including a rubberized mold, reflecting the shaped form of the other side of said piece of metal, and a hard plastic mold cover, said hard plastic mold cover being fixedly attached to said rubberized mold, said rubberized mold and said hard plastic mold cover having an area therein cut in a specific pattern for applying plating metal to the specific areas of said piece of metal;

c) means for securing and holding said first mask part and said second mask part about said piece of metal; and d) an electrode, fixedly attached to said second mask part such that said electrode is in electrical communication with said piece of metal when said second mask part is secured to said piece of metal for plating.

7. The mask of claim 6 wherein the means for securing and holding said first mask part and said second mask part about said piece of metal comprises a clamp.

8. The mask of claim 7 further comprising a means for supporting a clamp, fixedly attached to said first and said second mask parts.

9. The mask of claim 8 wherein the clamp supporting means comprises:

a) a first pair of metal strips fixedly attached to said first mask part; and b) a second pair of metal strips fixedly attached to said second mask part.

10. The mask of claim 9 wherein said first pair of metal strips are attached perpendicularly on said first mask part, and said second pair of metal strips are attached perpendicularly on said second mask part.

11. The mask of claim 10 further comprising a first clamping pad fixedly attached to said first pair of metal strips; and a second clamping pad fixedly attached to said second pair of metal strips.

12. The method of forming a mask for selectively plating specific areas of a piece of metal comprising the steps of:

a) placing the piece of metal into a mold form;

b) applying a curable, rubberized polymer to one side of said piece of metal;

c) curing said rubberized polymer, thereby forming a rubberized mold;

d) removing said rubberized mold from said mold form;

e) selectively removing areas of said rubberized mold as desired;

f) attaching said rubberized mold to a hard plastic mold cover;

g) selectively removing areas of said hard plastic mold cover, corresponding to the areas removed from said rubberized mold, to produce a mask for one side of the piece of metal; and h) fixedly attaching an electrode to said mask.

13. The method of claim 12 further comprising the steps of:

a) inverting the piece of metal in the mold form; and b) repeating steps b–g of claim 14, to create a mask for the other side of the piece of metal.

14. The method of claim 12 wherein the step of fixedly attaching an electrode to the mask further comprises placing the electrode on said mask such that said electrode is in electrical communication with the piece of metal to be plated.

15. The method of claim 12 further comprising the step of fixedly attaching at least one clamp support to said mask.

16. The method of claim 15 wherein the step of fixedly attaching at least one clamp support to said mask comprises the steps of:

a) attaching a first strip of metal to said mask;

b) attaching a second strip of metal to said mask, such that said first and second strips of metal are perpendicular and meet in a center point; and c) forming a clamp pad on said center point of said first and second strips of metal.

17. The method of claim 12 wherein said mold form includes: a flat plate; and a form, adjustably attached to said plate having an opening therein for receiving and surrounding the piece of metal to be plated.

* * * * *